United States Patent [19]
Megy

[11] Patent Number: 5,776,225
[45] Date of Patent: *Jul. 7, 1998

[54] REFRACTORY METAL SPONGE FINES COMPOSITION

[76] Inventor: Joseph A. Megy, 100 N. Chester St., New Cumberland, W. Va. 26047

[*] Notice: The term of this patent shall not extend beyond the expiration date of Pat. No. 5,471,359.

[21] Appl. No.: 753,157

[22] Filed: Nov. 21, 1996

Related U.S. Application Data

[63] Continuation-in-part of Ser. No. 338,594, Nov. 15, 1994, Pat. No. 5,597,401.

[51] Int. Cl.$^6$ .................................................. C22C 29/00
[52] U.S. Cl. ........................... 75/304; 75/308; 75/310; 75/314; 75/255; 75/770; 134/2; 241/3; 241/15; 241/25
[58] Field of Search ............................. 75/304, 308, 310, 75/314, 255, 770; 134/2, 3; 241/3, 15, 25

[56] References Cited

U.S. PATENT DOCUMENTS 5,171,359  12/1992  Megy .................................... 75/230
5,597,401  1/1997   Megy .................................... 75/304

Primary Examiner—Melvyn Andrews
Attorney, Agent, or Firm—William G. Lane

[57] ABSTRACT

A clean refractory metal sponge fines product is made from refractory metal sponge fines free of refractory metal oxides, carbides, nitrides and binary iron alloys; silicon carbide, oils, greases and organic compounds; salt; dust; dirt; pieces of iron, iron alloy and tungsten carbide; and light contaminants. The sponge fines are vigorously washed and rinsed with a displacement wash to remove the bulk of the wash fluid and subject to a counter-current wash to yield clean refractory metal sponge fines. The clean sponge fines can be pressed into briquettes and sintered at elevated pressures, or mixed with an alkali metal refractory metal halide slat, pressed at elevated pressures into sponge fines/salt briquettes and dried or pressed into briquettes, dried and packaged, or pressed into briquettes and stored wet. The briquettes are non-pyrophoric.

20 Claims, 3 Drawing Sheets

5,776,225

REFRACTORY METAL SPONGE FINES COMPOSITION

This is a continuation-in-part application of my pending U.S. Pat. application Ser. No. 08/338,594, filed on Nov. 15, 1994 now U.S. Pat. No. 5,597,401.

BACKGROUND OF THE INVENTION

This patent relates to processes to convert refractory metal (titanium and zirconium) sponge fines from refractory metal (titanium and zirconium metal) reduction operations into consolidated, safe to handle, raw materials suitable for aluminum, magnesium and iron refractory metal alloys and aluminum alloys, such as aluminum-titanium alloys, magnesium-zirconium alloys, aluminum-zirconium alloys, iron-titanium alloys, and the like.

At present, most refractory metal products are produced from sponge which is produced from the reduction of refractory metal chlorides. Whenever refractory metals are heated above about 700° C. in air, refractory metal oxides and nitrides are formed with large heat release varying in thickness depending on both the temperature and time. Whenever refractory metals come in contact with iron or iron alloys at high temperature, e.g., 100° C. or more, refractory metal/iron bimetallic alloys are formed on the surface of the refractory metal. These refractory metal alloys of oxygen, nitrogen, carbon and iron are contaminants that destroy the alloying value of the refractory metal. For large consolidated refractory metal pieces, the surface contaminants are removed by belt grinding processes in which a silicon carbide, aluminum-zirconium oxide or other hard grit, typically about 60 mesh, bonded to a belt is moved over the surface of the metal, removing a mil to several mils of the surface per pass under large volumes of water in the form of small curved slivers of the refractory metal. Belt grinding is also used to obtain flat surfaces on refractory metal plates and slabs and to obtain rounded surfaces on rods on other round objects. For small pieces or particles of refractory metal, such as sponge fines, the refractory metal/oxygen, nitrogen, iron and carbon alloys cannot be removed by belt grinding.

Refractory metals are also treated by other abrasive operations, such as grinding with abrasive wheels or stone grinding using copious coolant.

Refractory metal is recovered from refractory metal oxides ores as a refractory metal sponge which is melted in an inert atmosphere or under a vacuum and further treated to produce ingots, castings, and the like. Because of the pyrophoric nature of refractory metal, refractory metal sponge fines, i.e., sponge having a mesh size of less than 20 mesh (Tyler), is very flammable and involves substantial safety risks in storage, transportation and handling. Refractory metal sponge fines (mesh size less than 30 mesh Tyler, most often—100 mesh) are presently burned in special furnaces to produce refractory metal oxides that are recycled into refractory metal oxide ores for processing into refractory metal chlorides which are reduced to refractory metal sponge or formed into an aluminum alloy, especially zirconium sponge fines.

The refractory metals titanium and zirconium are made from relatively cheap and plentiful ores. The extraction, purification and consolidation of these metals is, however, expensive. Thus the metallic value in the refractory metal sponge fines is sufficient to warrant recovery if it can be reprocessed to eliminate its hazardous, pyrophoric nature and cleaned of components detrimental to potential end uses.

SUMMARY OF THE INVENTION

The present invention is directed to a process for producing a purified, clean refractory metal product prepared from refractory metals sponge fines substantially free of oxides, nitrides and carbides of refractory metal, bimetallic alloys of refractory metals and metals such as iron, nickel, and cobalt and alloys thereof, organic compound contaminants, silicon carbides and tungsten carbide contaminants. By substantially free it is meant that the purified, clean refractory metal sponge fines contain less than 0.05% by weight, 0.07% oxygen as metal oxides and less than 0.1% by weight of the other contaminants.

In one embodiment of the present invention, sponge fines are separated from refractory metal sponge particles and are made into useful products by:

intensely agitating the sponge fines in a dense slurry, optionally, with cleaning solutions to purify and clean the sponge fines;

separating the refractory metal sponge fines from the slurry aqueous phase; and washing the refractory metal sponge fines with clean water to yield clean refractory metal sponge fines.

The intense agitation operation selectively fractures and removes hard refractory metal material as a fine dust from the sponge fines. The hard refractory metal material is produced by the embrittlement of the refractory metal by oxygen, nitrogen, carbon and sometimes other elements, such as iron, from surface reactions on the refractory metal. Preferably the vigorous agitation is carried out with a detergent, such as Calgon dishwashing detergent, to solubilize oil or other organic compounds present on the sponge fines. The detergent also wets the hard refractory material fine dust to disperse the fine dust and prevent it from settling out in the sponge fines/cleaning solution slurry. The aqueous phase dissolves the salt associated with the sponge fines.

As stated above, refractory metal sponge is produced by the reduction of refractory metal chlorides in a reduction furnace. The resulting product is refractory metal sponge first sheared to reduce the size of the sponge and then subject to a ripping operation wherein the size of the sponge is reduced to a size of ¾" or less. After the ripping operation, the sponge is screened and oversized particles (greater than ¾") are recycled back into the ripping operation and the small particles (less than 20 mesh) are considered waste and are presently oxidized in a special furnace to form refractory metal oxides which are then formed into chlorides and reduced to form refractory metal sponge again. During the shearing and ripping operation, following the screening operation, the sponge is frequently coated with dry salt (normally sodium chloride salt) to put out fires that occur in the sponge, especially the sponge fines. During the fires that occur, refractory metal oxides and nitrides are formed. Bimetallic refractory metal/iron alloys are formed on the surface of the refractory metal sponge adjacent to the walls of the steel container during the reduction operation. Sometimes metal oxides, nitrides and carbides are formed during the reduction operation from air leaks and/or organic contamination and/or metal oxides and/or magnesium nitrides are inadvertently introduced in the reduction operation.

Preferably, the washing of the sponge fines comprises at least a displacement wash with water followed by filtration. In a preferred embodiment, the filtered sponge fines following the displacement wash are subject to at least three counter-current washes with water. The sponge fines become cleaner with each succeeding wash and the washing fluid becomes progressively more contaminated with each wash.

The washing fluids from the counter-current wash can be used as a displacement wash fluid.

If a cleaner refractory metal from sponge fines is required, after the washing step, the cleaned sponge fines can be acid etched with a mineral acid, such as 10% hydrochloric acid, for a sufficient period to etch metallic impurities, such as iron particles, and then washed with water to remove the acid and any metal chloride salts. In another preferred embodiment of the present invention, the clean sponge fines after the final wash are pressed at elevated pressures into briquettes, compacts, or other formed body shapes (collectively "briquettes") which reduces the sponge fines void volume by at least a factor of two (2). The pressing operation is carried out with the sponge fines in a fully wetted state to minimize a reaction of the clean refractory metal sponge fines surface with oxygen and/or nitrogen and to prevent fire. After the pressing operation, the sponge fines briquettes can be dried in a vacuum dryer indirectly heated. After the briquettes are dried, they are individually wrapped to prevent loose sponge fines from dropping out of the briquette. Fully wetted, in contrast to moist, briquettes can also be wrapped and boxed to prevent the loss of the water in the briquette.

Conveniently, briquettes can be made in one (1) pound sizes and wrapped with aluminum foil, such as kitchen grade aluminum foil which is about two (2) mils thick. The briquette can be wrapped in aluminum foil in a single layer thick. The edges of aluminum foil are preferably over lapped twice, both at the common seam and at the ends to minimize loss of fines from the briquette. Heavier aluminum foil can be used and the briquette can be wrapped with double or triple layers of foil.

It has been found that compacted refractory metal sponge fines briquettes can be stored if the briquettes are packaged as described herein and the briquettes are dry (0.05% moisture or less) or fully wetted. Moist, in contrast to fully wetted, refractory metal sponge fines can react with water in the presence of air to produce hydrogen and refractory metal oxide. Hydrogen can vigorously react with oxygen and can initiate combustion of the refractory metal sponge fines, and a mixture of refractory metal sponge fines and moisture or a limited amount of water can cause a fire which burns aggressively if ignited.

In another preferred embodiment of the present invention, the clean concentrated refractory metal sponge fines are processed into refractory metal/salt briquettes. If sufficient salt is employed, the briquettes are not flammable. Refractory metal sponge fines briquettes, either made directly from straight refractory metal or from a blend or mix of refractory metal with a halide salt, do not sustain combustion at room temperature. Even if the briquette is ignited with an acetylene torch, once the flame is removed from the briquette, the burning will cease. However, if the briquette is heated to a temperature near the ignition temperature for the refractory metal, and then subject to direct flame from an acetylene torch or the like, the refractory metal sponge fines briquette will burn quite vigorously and sustain combustion. A salt impregnated briquette will burn slower than a straight refractory metal briquette if preheated and the more salt present, the lesser the rate of burning. The clean concentrated refractory metal sponge fines, in a wet state, are mulled with an alkali metal halide salt type to produce a refractory metal/salt mixture. Sufficient alkali metal halide salt type can be employed in the mixture to render the refractory metal/salt briquette product nonflammable under all conditions. However, lesser salt can be used when the salt is added to help flux the refractory metal into an aluminum or iron alloy melt.

In one embodiment of the present invention, refractory metal sponge fines having a particle size less than 20 mesh Tyler (particles passing through 0.841 mm sieve opening) are purified by vigorously agitating the refractory metal sponge fines with water in a dense aqueous slurry containing about 30% by weight solids. Refractory metal sponge fines sometimes have a particle size less than 40 mesh Tyler (0.420 mm mesh sieve opening).

If the sponge fines are contaminated with alkali halide salt, dirt, oils, surfactants or other contaminants, the slurry of refractory metal sponge fines is separated from the slurry water and the refractory metal sponge fines are washed with clean water again to yield clean refractory metal sponge fines.

The vigorous agitation substantially aids in the washing of the sponge fines and washes the sponge fines free of salt.

The vigorous agitation carried out for a sufficient period to break down and break off the hard refractory metal material from the surface of the refractory metal sponge fines. The intense agitation is carried out for at least four hours, and preferably for about eight hours to not only break off the hard refractory metal material, but also to reduce it to fine dust so that it can be readily separated from the refractory metal sponge fines at the completion of the intense agitation. The use of a detergent aids in disbursing and floating the fine dust away from the refractory metal sponge fines.

If the sponge fines are contaminated, the sponge fines are preferably first mixed with a detergent aqueous solution, such as Calgon dishwashing detergent, to solubilize any oil present and remove dirt. The detergent also wets the hard refractory material fine dust of the oxides, nitrides and carbides of refractory metals to disburse the fine dust and prevent it from settling out in the aqueous slurry.

Sponge fines usually contain iron particles. The refractory metal/iron binary alloy particles are preferably removed from the refractory metal sponge fines during the intense agitating step with aqueous detergent or water. A substantial portion of the iron and refractory metal/iron binary alloy particles may be removed during the mixing step by inserting one or more magnetic bars or rods into the refractory metal sponge fines aqueous slurry. The iron particles and any other magnetic particles are magnetically attracted to the magnetic bars. The bars are withdrawn from the slurry from time to time and wiped free of particles and then inserted back into the slurry. The operation is repeated until the magnetic bars attract few, if any, magnetic particles.

If the sponge fines are mixed in a aqueous detergent slurry, the sponge fines after separation from the aqueous detergent slurry phase, are washed with a displacement wash of water followed by filtration. The displacement wash removes a substantial amount of the adherent aqueous detergent which can be recycled back into the agitation step as the aqueous detergent. Preferably, if the sponge fines are mixed in an aqueous detergent, the sponge fines, after a displacement wash to separate the wash water, are subject to at least three counter-current washes with water. The sponge fines become cleaner with each succeeding counter-current wash and the washing fluid becomes more progressively contaminated with each succeeding wash step. The washing fluids from the counter-current washes can be used as a displacement wash fluid or water.

If the sponge fines are not free of iron or iron alloy after the washing steps, the washed sponge fines can be acid etched with a mineral acid, such as 10% hydrochloric acid, for a sufficient period to etch metallic iron from the sponge fines as described herein. The sponge fines are then washed with water to remove the acid and any metal chloride salts.

After the sponge fines are freed from the aqueous slurry phase or solution or from the wash fluids, the cleaned fully wetted sponge fines are pressed at elevated pressure in a mold or form into refractory metal sponge fine briquettes or other formed body shapes (collectively "briquettes"). The sponge fines are pressed at a pressure sufficient to reduce the refractory metal sponge fines void volume by at least a factor of 2. The pressing operation must be carried out with fully wetted, not merely moist, sponge fines to minimize the reaction of the clean refractory metal sponge fines with oxygen and/or nitrogen to prevent combustion and fire. Sponge fines, because of their small volume and great surface area present a serious potential fire hazard at all times. However, after the fully wetted refractory metal sponge fines are pressed into briquettes, the briquettes can be dried in a vacuum dryer with indirect heat. The finished dry briquettes are very stable, they are very difficult to ignite at room temperature, they require a direct flame to ignite and they will not continue to burn after the direct ignition flame source is removed when the total briquettes are not heated to or near the refractory metal ignition temperature. Preferably, each individual briquette is wrapped to prevent loose sponge fine particles from dropping out of the briquettes. Individual sponge fine particles, because of their high surface to volume ratio, are very susceptible to ignition from an open flame or a spark and have highly reactive surfaces with respect to oxygen and nitrogen. The wrapping prevents the particles from dropping out of the briquette and forms a barrier between the briquette and any open flame, spark and air. Aluminum wrapping offers another advantage with respect to the briquettes. When the briquettes are wrapped with aluminum foil, there is an added protection against fires. Aluminum and refractory metal when heated to high temperatures form titanium trialuminide or zirconium trialuminide binary alloy depending upon the refractory metal in the briquette. Titanium trialuminide and zirconium trialuminide cannot be burned in ordinary air fires.

Conveniently, the briquettes can be made in one pound sizes and wrapped with aluminum foil, such as kitchen grade aluminum foil which is about 2 to 10 mils thick. The briquettes can be wrapped in aluminum foil, a single layer thick. The edges of the aluminum foil are preferably overlapped twice, both at the common seam and at the ends to minimize into the briquettes. Heavier aluminum foil can be used and a briquette can be wrapped with double or triple layers of foil. The aluminum foil protects the briquette from sparks - aluminum is a sparkless metal - and forms a flame barrier for the briquettes. The briquettes can also be wrapped in a plastic film such as polyethylene film, Saran brand type film, Cellophane brand type film or other film which can be used to wrap the briquette to prevent the escape of individual sponge fine particles. The briquettes can be conveniently wrapped in a heat shrink plastic. Briquettes that are made from an alkali metal halide salt or alkali metal refractory metal halide salt and a refractory metal are preferably wrapped in a plastic film or heat shrink plastic because the salt mixture can attack aluminum foil in a galvanic reaction causing the aluminum foil to disintegrate. The plastic wrap is not attacked by such a mixture. Preferably after the briquette, either straight refractory metal briquette or a salt mixture/refractory metal briquette is wrapped in plastic or heat shrink plastic, the briquette has an outer wrapping of aluminum foil to protect the briquette from sparks and form a flame barrier. Alternatively, the briquettes can be coated, either dip coated or spray coated, with paraffin wax, non-pigmented lacquer, non-pigmented shellac, non-pigmented varnish, non- pigmented polyurethane and the like to secure the loose sponge fines within the briquette and to form an air, flame and spark barrier. For use in aluminum refractory metal aluminum alloy melts, aluminum foil is the wrapping of choice.

Preferably, the briquettes are wrapped with aluminum foil as described above, or with a plastic film, or placed in plastic bags having one or more briquettes with the bag opening twisted closed with a piece of string or metal twist-it fastener. If a number of briquettes are to be stored in a plastic bag, the bag can be flushed with an inert gas after it is filled with briquettes and before being closed.

Optionally, the refractory metal sponge fine briquettes free of salt can be sintered by heating the briquettes to a temperature between about 800° and 1100° C. under a vacuum or under an inert gas atmosphere, such as a helium, argon or the like, for a period of time, such as one-half hour, sufficient to sinter the refractory metal in the briquettes to form sintered sponge fine briquettes. Preferably the sintering is done at about 950° C. The sintered briquettes have less void volume and far less surface area than the refractory metal sponge fines. The sintered briquettes are not pyrophoric. Such briquettes can be stored in the air and can be stored without wrapping.

The compacted refractory metal sponge fines briquettes can be stored, transported or handled safely in the dry state (less than 0.05% by weight and moisture) or fully wetted. Moist refractory metal sponge fines, even pressed sponge fines, can react with water in the presence of air to produce hydrogen. Hydrogen can vigorously react with oxygen and can initiate combustion of the refractory metal sponge fines. Thus the briquettes are vacuum dried or maintained fully wet.

In another embodiment of the present invention, the slurried refractory metal sponge fines or washed refractory metal sponge fines are processed into non-flammable refractory metal/salt briquette. The comminuted refractory metal sponge fines, in a moist state, are mulled with an alkali metal halide salt type to produce a refractory metal/salt mixture. Sufficient alkali metal halide salt can be employed in the mixture to render the refractory metal/salt briquette non pyrophoric. Alternatively, less alkali metal halide salt can be employed for other reasons, such as for the purposes of performing a flux for the dissolution of the refractory metal briquettes into molten aluminum or molten iron. The refractory metal/salt mixture is pressed into refractory metal/salt briquettes. The pressed refractory metal/salt briquettes are dried to produce dried refractory metal/salt mixture briquettes. The refractory metal sponge fines are mixed with about 30 to about 100% by weight of the refractory metal with the alkali metal halide salt. Thus, the dried refractory metal/salt mixture briquettes are comprised of about 23% to about 50% by weight salt with the balance being the refractory metal. Less amounts can be used but the flammability of the mixture increases.

The alkali metal halide salt type can be an alkali metal refractory metal halide, such as sodium titanium fluoride, potassium titanium fluoride, sodium zirconium fluoride, potassium zirconium fluoride or the like. The salt type can also be an alkali metal halide, such as sodium fluoride, potassium fluoride, sodium chloride, potassium chloride, and the like, or a mix of an alkali metal refractory metal halide and alkali metal halide. In addition, the alkali metal halide salt type can be a sodium boron fluoride, potassium boron fluoride and the like. Preferably the alkali metal halide salt type is an alkali metal refractory metal fluoride salt wherein the refractory metal is the same as the refractory metal in the sponge fines. For example, if the refractory metal sponge fines is titanium sponge fines, the preferred salt type would be an alkali metal titanium fluoride salt. If the aluminum alloy contains boron in addition, preferably the alkali metal halide salt type will be a mixture of salts wherein one of the salts will be an alkali metal boron fluoride salt.

Both the refractory metal Ti and Zr particles and the Ti and Zr salts in the refractory metal/salt briquettes will report to the aluminum alloy. The salt appears to serve as a flux which aids in the dissolution of the refractory metal particles into the aluminum, magnesium and iron alloys. When the aluminum alloy contains boron, the refractory metal in the Ti salts reacts with the boron salt to form $TiB_2$ alloy which reports to the aluminum alloy.

Thus, the non-inflammable refractory metal/salt briquettes can be utilized to furnish the aluminum alloy with refractory metal or refractory metal and boron, if boron is present in the aluminum alloy. It appears that the refractory metal in the briquette functions as a scavenger for the iron and stainless steel alloys by consuming oxygen, carbon and nitrogen present in the alloy.

The refractory metal/salt mixture briquettes are dried so that the briquettes can be safely added to the aluminum, magnesium or iron alloy. If appreciable moisture is retained in the briquettes, the moisture in the briquettes upon contact with the hot, molten aluminum magnesium or iron alloy reacts violently with the molten metal to form hydrogen which is hazardous.

DETAILED DESCRIPTION OF THE PREFERRED EMBODIMENT

Mixing

Figure 1:
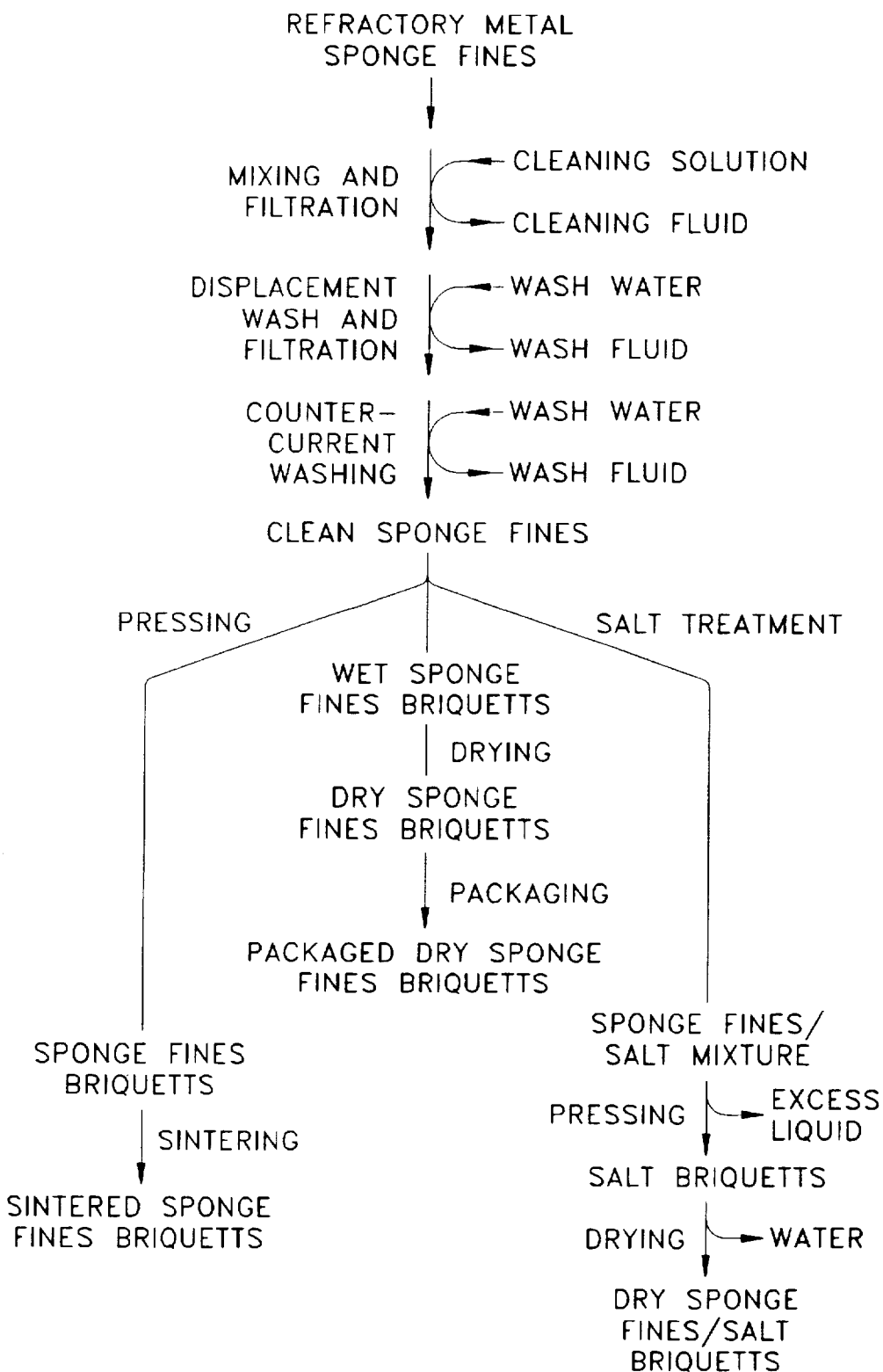
FIG. 1 is a flow sheet showing a process of the present invention for treating refractory metal sponge fines.

Referring to FIG. 1, in the process of the present invention, the refractory metal sponge fines are vigorously agitated with cleaning solution, such as water, or an aqueous detergent cleaning solution, or an organic cleaning solution, such as alcohols, esters, ketones or the like. This intense agitation operation is conveniently carried out with an intensive mixer, such as a Morehouse—Cowles Direct Drive Disperser.

An intensive mixer can reduce the aspect ratio of the sponge fines, but this is not required for the present process. This operation results in a slight change in the bulk density of the sponge fines by increasing the packing volume.

After agitating the refractory sponge fines with water or aqueous cleaning solution, or organic cleaning solution, the cleaning fluid is separated from the sponge fines by decanting to separate impurities to fines from the larger refractory metal sponge fines, break up bimetallic inclusion, decanting, or the like. After separation the sponge fines are preferably further processed in several wash steps in series, which removes the organic matter and inorganic salts, such as sodium and/or potassium chloride salts, that are common components of the salts used in the sponge production process. Decanting also tends to remove some of the iron as refractory metal/iron binary alloy fines which may contaminate the sponge fines. The washing is conveniently and most preferably done with water although aqueous solutions, organic solvents, such as alcohol, and the like, can be used.

Displacement Washing and Separation

The mixed refractory metal sponge fines are first washed with a displacement wash of water. The sponge fines are separated from the displacement wash water, usually by filtration. This wash step is normally carried out in the filtration apparatus.

Counter-Current Washing and Separations

Figure 2:
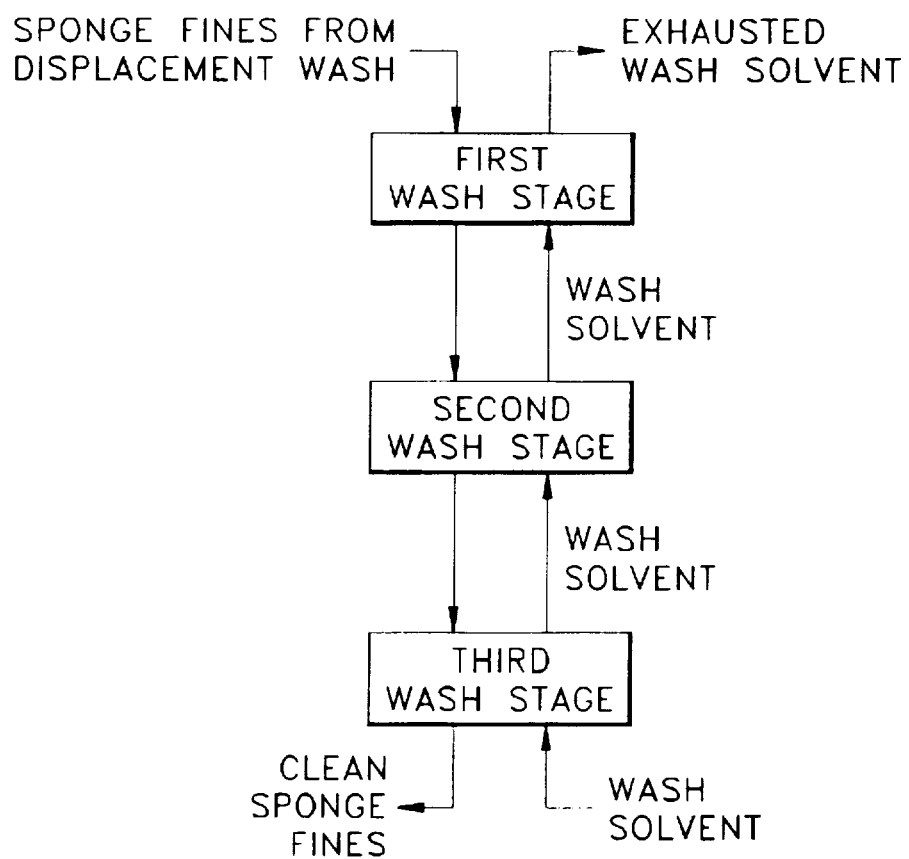
FIG. 2 is a flow sheet showing the counter-current washing step for the process of FIGS. 1 and 3.

Next a counter-current wash is carried out in at least three (3) stages. Referring to FIGS. 1 and 2, the sponge fines from the displacement wash are passed to the first wash stage wherein the sponge fines are washed with the wash solvent, such as wash water, from the second stage. Preferably the washing in each stage is intensive to remove contamination entrapped in the sponge fines. The sponge fines are separated from the wash solvent and passed to the second stage where the sponge fines are washed with wash solvent from the third stage. The wash solvent from the third stage can be disposed of in an environmentally sound way or, preferably, it can be passed to the displacement wash stage wherein it is used as the displacement wash described above. After the sponge fines are washed in the second wash stage, the sponge fines are separated from the wash solvent and passed to the third wash stage where the sponge fines are washed with fresh wash solvent. The wash solvent from the second wash stage is passed to the first wash stage. After the sponge fines are washed in the third wash stage, the clean sponge fines are separated from the wash solvent and burned as waste material or, preferably, pressed into briquettes and optionally sintered, or mixed with an alkali metal halide salt type, pressed into briquettes and dried. The wash solvent from the third wash stage is passed to the second wash stage.

In counter-current washing, the sponge fines as they are cleaned from stage to stage are washed with progressively cleaner solvent. This type of washing substantially removes the components of the displacement wash from the sponge fines.

Following the washing process, it is necessary to insure that all of the refractory metal sponge fines remain wet to prevent fire.

Sponge Fines/Salt Mixture

Referring to FIG. 1, the wet clean sponge fines can be mixed with refractory metal alkali metal fluoride salts in ratios consistent with the ratios of refractory metal in the aluminum alloy. For example, if the aluminum alloy contains 5% by weight titanium and 2% by weight boron, the salt mixture can be formulated to have a 5:2 weight ratio of titanium and boron. For making aluminum-titanium or aluminum-titanium-boron alloys as an end product, then potassium titanium fluoride, potassium boron fluoride, and titanium sponge fines can be mixed in ratios appropriate to the end product, as will be explained.

Analogous mixtures of refractory metal halide salt and refractory metal sponge fines can be made to produce aluminum-zirconium, magnesium-zirconium, iron-titanium, and iron-zirconium alloys. For preparation of magnesium-zirconium aluminum alloys, mixtures of potassium zirconium fluoride or sodium zirconium fluoride, magnesium fluoride and zirconium sponge fines are useful. For producing products requiring the refractory metal component only, a mixture of the sponge fines with potassium aluminum fluoride for the aluminum alloy manufacturing process is effective.

The instant process permits the heretofore unused sponge fines to be used in the alloy industry as a getter for O, N, and C and as a grain refiner.

The sponge fines are mixed with the alkali metal refractory metal fluoride salts with sufficient mixing to insure that the surfaces of the sponge fines, which are quite extensive due to the small average size of the fines, are completely wetted with the salt. The wet, alkali metal refractory metal fluoride salt-laden sponge fines are then preferably compressed to a convenient size. The pressing must be carried out with wet refractory metal sponge fines. High compressive forces should be used, such as 5000 pounds per square inch (psi) or more. Preferably the briquettes are compressed at a sufficient pressure to 'set' the compacted or compressed particles of sponge fines and form briquettes having a density of the alloy metal melt which the briquettes are to be used in. If the briquettes are compressed at insufficient pressure, the sponge fines particles are not sufficiently 'set' in their compacted configurations and the resulting briquettes are loose and easily come apart. When the fines are sufficiently compacted to fix and set the fines, the briquettes are firm and consolidated. The wet sponge fines alkali refractory metal fluoride mixture may be compacted with conventional equipment. Useful devices include die and mold presses, briquettes, and corrugated and smooth roll presses, and the like. This step squeezes out much of the wash water from the sponge fines/salt mixture. Once compressed, the briquette has structural integrity due to the deformation and interlocking of the sponge fines with each other.

The compressed sponge fines/salt mixture forms a compacted mass unit or briquette which is preferably dried. The compacted mixture or mass unit or briquette can be dried in conventional equipment, such as tray dryers, belt dryers, etc. The compressed or compacted mixture can also be dried in a vacuum dryer with indirect heating, such as steam coils. Although a direct flame is preferably avoided, an indirect flame can be used to dry as the compacted mixture is not flammable if it has at least 23% by weight salt on a dry basis; such a compacted/mixture will not sustain combustion even if heated to red heat under a torch. For sponge fines/salt compacted mass units having less than 23% by weight salt on a dry basis, burning may occur, but at a slow, controllable rate. A fluoride salt can be added to aid in slag metal separation in an aluminum cast house furnace. Less than 23% by weight salt can be added for such uses. The drying in conventional equipment is heat transfer limited and no "bound water" or "difficult to remove water" is observed. As the compacted sponge fines dries, water leaving the mass unit, leaves a salt residue in the briquette. Since surface tension acts to cause collection of the liquids at points of closest contact between the individual pieces of metal sponge fines, the evaporation of the water leave salt "bridges" attached to the closest points of metal. Salt bridging between very close points of contact form sturdy bonds. Therefore, these "salt bridges" strengthen the compressed briquettes.

The sponge fines can be mixed with salt over a wide weight range, such as from 1:2 to 9:1 refractory metal:salt on a dry basis. The upper limitation for salt appears to be when the salt content interferes with the structural integrity of the compacted mass unit and renders it friable or easily broken.

The sponge fines/salt compacted mass unit is superior to the commonly used sponge or scrap in aluminum alloys. It dissolves more readily and in higher yield into the molten metal and is more reactive with the other components of the compact briquette, for example, boron.

The sponge fines/salt compacted mass unit, i.e., the briquette, having at least 30% by weight salt is also flame resistant and therefore safely handled and stored in air. The substantial degree to which the compacted admixture of alkali metal refractory metal fluorides salt and refractory metal sponge fines suppress flammability appears to be due to several factors.

First, the alkali refractory metal fluorides arrest the flame propagation reactions in combustion processes. The fluoride in the alkali metal fluoride salts and the alkali metal refractory metal fluoride salts suppresses free radical generation which is an important reaction in the combustion process. Some refractory metal fluoride compounds have, in the past, been used as fire retardants in clothing.

Secondly, the alkali metal refractory metal and alkali metal aluminum fluoride salts mentioned above have melting points around 650° C., or just below the temperature at which titanium and zirconium allow rapid diffusion of oxygen necessary to sustain combustion. The highly endothermic melting process of the alkali metal refractory metal fluoride salts removes heat from the refractory metal sponge fines, as the salts melt at just below the combustion temperature of the refractory metal.

Thirdly, once melted, the molten alkali metal refractory metal fluoride salt strongly wets the surface of the refractory metal sponge fines with a molten salt film that severely limits transport of oxygen and nitrogen to the metal to support combustion.

Fourthly, the molten alkali metal refractory metal fluoride salt forms a molten film which fills void spaces in the refractory metal sponge fines/salt compacted mass unit which would otherwise transport air to the interior of the compact and to those sites inside the briquette which would otherwise have the air metal mixture appropriate for the reaction.

Table salt, NaCl, or any other alkali metal halide salt, such as potassium chloride, potassium fluoride, may be added to the sponge fines/salt mixture prior to pressing to enhance the economics of the resulting mixtures since such salts are cheaper than the refractory metal salt and can assist in the reduction of the vapor pressure over the aluminum refractory metal alloy metal during the addition of the compacted mass unit. In one embodiment, two (2) moles of potassium chloride are added for each mole of potassium fluotitanate. As can be deduced from the mechanisms outlined above, the addition of an alkali metal no-refractory metal halide salt will assist in accomplishing some of the above objectives. Although sodium chloride melts at about 801° C., and potassium chloride melts at about 776° C., slightly above the temperature where the refractory metals allow rapid diffusion of oxygen, the presence of these salts still acts to retard refractory metal combustion particularly as a eutectic of the alkali metal halide and alkali metal refractory metal halide salt mixture which melts at a lower temperature than either salt alone.

Where the manufacture of refractory metal-boron aluminum alloys is of importance, the alkali metal refractory metal fluoride salt may be mixed in proportion with an alkali metal fluoro borate salt. In this manner, the boron is more easily added to the aluminum alloy, and it serves to reduce the flammability of the compacted mass unit, along with the alkali metal refractory metal fluoride salt. For example, potassium fluoroborate has a melting point of about 350° C., and would similarly melt below the temperature at which oxygen diffusion into refractory metal takes place. The melting of the potassium fluoroborate would begin to pull any other salts present into its molten solution early on, and thus perform some of the above factors in an accelerated manner. The addition of potassium titanium fluoride, potassium boron fluoride, an/or potassium zirconium fluoride, optionally with potassium fluoride, as an intimate mixture is preferred for preparation of aluminum alloys.

Once the sponge fines/fines/salt compacted mass unit or briquette is dried, it can be used in the production of alloys, aluminum alloys and/or re-alloying refractory metal. This unexpected result occurs despite the fact that raw, refractory metal with clean surfaces does not dissolve ass quickly when added to the alloy, aluminum alloy or metal molten mass. The salt rises to the top of the aluminum alloy molten mass and is easily drawn off. It appears the salt "fluxes" the dissolution of the refractory metal sponge fines with the molten aluminum.

Sponge Fines Sintered Briquettes

Referring to FIG. 1, in another embodiment of the present invention, the clean sponge fines can be sintered as a briquette. Once the sponge fines are washed, they can be compacted and dried without salt addition. The sponge fines are compacted fully wetted at elevated pressures, such as, at a pressure of 5,000 psi, preferably higher, such as 40,000 psi. The resulting compacted mass unit may be heated rapidly and briefly to between about 950° C. and 1100° C. in a vacuum to cause sintering. Sintering causes some of the individual sponge fines of the briquette to become bonded to each other to form a mass having an even higher integrity than the refractory metal sponge fines/salt compacted unit mass. In addition, the surface area of the sponge fines are highly reduced during sintering. Sintering at 1000° C. for four hours is sufficient. However, temperatures between 950° C. and 11 00° C. can be used to sinter the refractory metal sponge fines. The sintering is done under vacuum or in an inert gas atmosphere, such as under argon or helium. The resulting sintered refractory metal sponge fines briquettes can be used in refractory metal metallurgy.

Aqueous Detergent Washing

Figure 3:
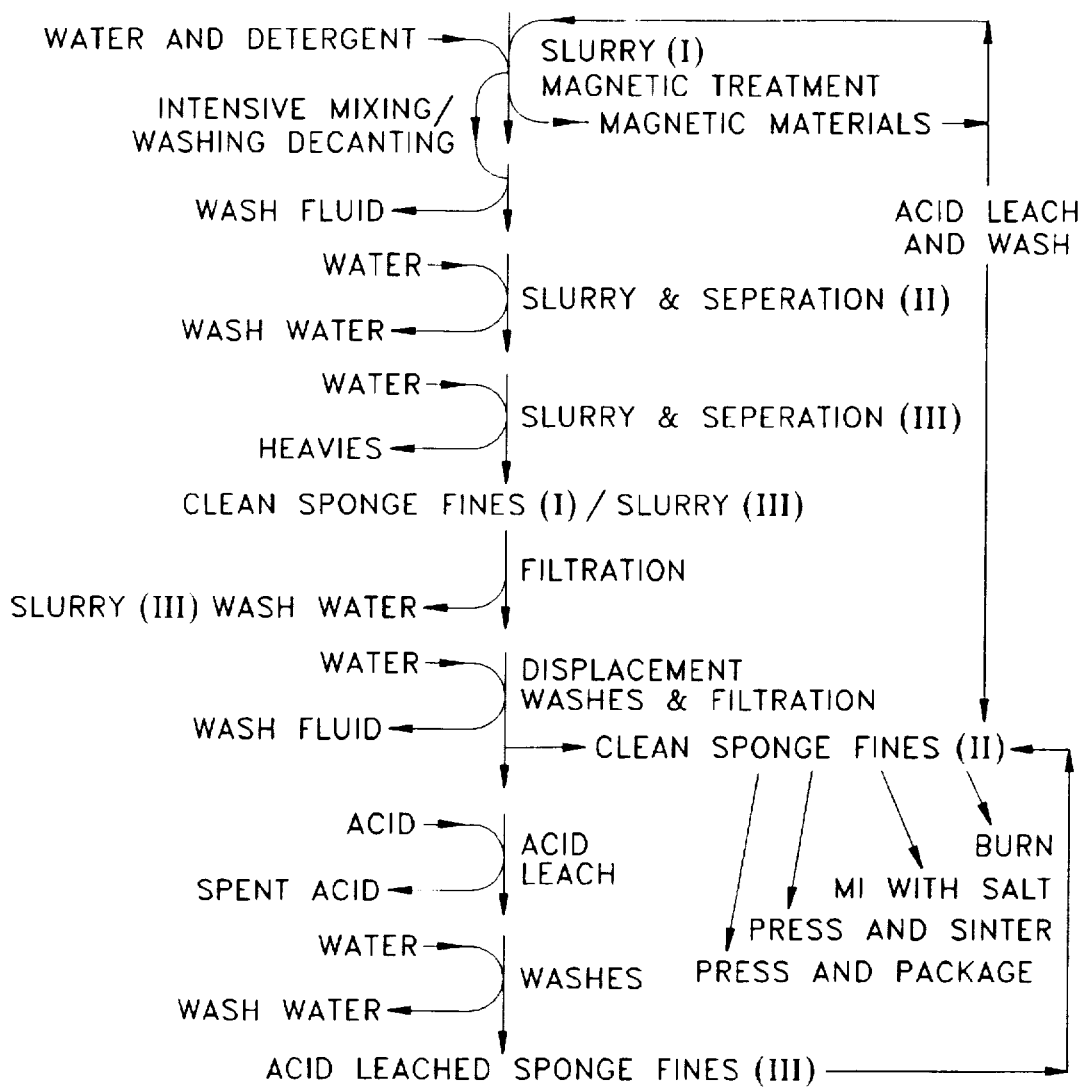
FIG. 3 is a flow sheet showing an alternative embodiment of the present invention for producing clean refractory metal sponge fine particles.

Referring to FIG. 3, an alternate embodiment of the present invention is illustrated. Refractory metal sponge fines are combined with an aqueous detergent and comminuted with a high intensity mixer, such as the Morehouse-Cowles Direct Drive Disperser in a mixer tank to form a slurry (I). The sponge fines are mixed with a water and detergent mixture prior to the intense agitation. The water and detergent mixture aids in cleaning off the surface of the sponge fines. The amount of water and detergent mixture added is not critical, but enough water and detergent are added to cover the sponge fines prior to mixing. As explained above, the intense agitation is an important step in the present invention since it removes hard refractory metal material from the surface of the refractory metal sponge fines. During the production of commercial grade refractory metal sponge, the sponge is subject to conditions wherein refractory metal oxides, refractory metal nitrides, refractory metal carbides, bimetallic alloys of refractory metal and iron formed on the surface. In addition, the sponge fines become contaminated with silicon and carbide. In addition, the sponge fines become contaminated with iron particles (particles of iron and iron alloys such as steel). These materials form a major contaminant to the refractory metal sponge fines and render the refractory metal sponge fines as scrap which cannot be utilized in an aluminum melt or iron melt. The agitation step subjects the individual sponge fine particles to numerous contact with other sponge fines. Sponge fines are somewhat malleable but the hard refractory metal material is not malleable but quite hard and quite brittle. These collisions between the individual refractory metal sponge fines and the dense aqueous slurry causes the hard refractory metal material to break off from the sponge fines. The hard refractory metal materials that break off the surface of the sponge fines makes innumerable collisions with other hard refractory metal material broken off from the sponge fines. These constant collisions of the small particles of hard refractory metal material causes such material to attrit and form a fine dust. Silicon carbide particles that are present as a contaminant in the sponge fines are also subject to attrition from the constant collision with hard refractory metal material during the intense agitation. The iron particles and iron alloy particles may or may not be particularly embrittled and are not subject to being reduced to a fine dust as the hard refractory metal material and the silicon carbide. However, the constant collision between the various particles and the aqueous slurry cause the iron binary alloys to be broken off from the surface of the refractory metal sponge fines.

Iron Removal

If the sponge fines contain iron or magnetic iron alloys or other magnetic material impurities, magnetic rods or bars can be inserted into the mixing tank during mixing to remove the magnetic particles. During the mixing, the magnetic rods or bars are withdrawn and the magnetic material attracted to the rods or bars is wiped off the rods and bars. The rods and bars area then re-immersed into the mixer tank. This magnetic treatment step is repeated until the magnetic bars or rods no longer collect magnetic material which indicates that substantially all the magnetic particles have been removed. During the mixing step, the intensive mixer breaks up some of the sponge fines and breaks off fine refractory metal oxides, nitrides, carbides, binary iron complexes and silicon carbide impurities in the sponge that sometimes form on the surface of the refractory metal sponge fines. After the mixing step is complete and the magnetic treatment carried out, which is only carried out if magnetic material is present, the mixing is stopped and the slurry mixture is allowed to settle for a minute or two. During the aqueous detergent washing/agitation step, the immersion of a magnet into the slurry mixture will quickly pick up particles of magnetic material if such material is present. Thus the magnets can be used to 'test' for magnetic particles in the sponge fines. The aqueous slurry mixture is decanted off. The decanted slurry comprises the wash fluid, a mixture of water and the detergent, and hard refractory metal material, silicon carbide, and light floating contaminants.

Water Washes

After the separation by decantation, the tank is recharged with water and the mixing action is commenced again to form a fresh aqueous slurry (II). This step only takes a minute or two. After the mixture has slurried up, the mixer is stopped and the mix is allowed to settle for a minute or two. The aqueous slurry is decanted off leaving a heavy wet residual at the bottom of the tank comprising primarily clean refractory metal sponge fines. The decanted slurry comprises primarily wash water contaminated with a slight amount of detergent, and some fines of hard refractory metal materials and silicon carbide. The tank is preferably charged with water again and once again slurried by starting up the mixer for a brief period of time. This slurry (III) is promptly discharged out of the tank before it has had an opportunity to settle. An additional charge of water may be added or needed to insure that all the clean sponge fines are slurried and discharged out of the tank. If there are any heavy non-refractory metal materials, heavies, in the initial charge of refractory metal sponge fines, such as metal bolts or nuts or the like, they will remain in the bottom of the tank because they are too heavy to remain suspended in the slurry and it will be too heavy to be drawn up into the pump. These heavy materials can be hand removed from the tank after the slurry mixture is removed.

The pumped refractory metal clean sponge fines(I)/water slurry (III) material is sent to a filter where the slurry (III) wash water is filtered off. The filtered sponge fines are displacement washed on the filter, preferably at least three (3) times with displacement volumes of water to thoroughly clean the refractory metal sponge fines. The clean sponge fines (II) at this point can be burned as described above, pressed and sintered as described above, formed into dried refractory metal sponge fines/salt briquettes as described above, or pressed and packaged as herein described.

Referring again to FIG. 1, refractory metal sponge fines are subject to a mixing operation with cleaning solution as described above. This operation is conveniently carried with an intensive mixer such a Morehouse-Cowles Direct Drive Dispenser. The intense agitation will result in the reduction of the aspect ratio of the sponge fines to a small extent and breaking off and breaking up the hard refractory metal material. The intense agitation thoroughly cleans the sponge fines and dissolve alkali halide salts contaminates on the sponge fines.

The sponge fines are covered with water or an aqueous detergent solution to prevent oxidation and possible fire because of the very pyrophoric nature of the sponge fines. The duration of the intense mixing is usually at least for four hours. Shorter or longer periods of intense mixing can be utilized depending upon the amount of hard refractory metal material and silicon carbide present. I have found eight hours of intense agitation will remove substantially all the hard refractory metal material from the sponge fines and reduce it and silicon carbide to a dust which remains suspended in the slurry. The intense agitation is stopped to yield an aqueous slurry. After the intense mixing, the slurry is allowed to settle for at least five minutes. Heavies, which are described below, and the refractory metal sponge fines report to the bottom of the mixer. Lights, i.e., light materials, such as wood and plastic, float to the surface of the slurry aqueous phase. The hard refractory metal material and silicon carbide remain suspended in the slurry aqueous phase. The slurry water or aqueous phase also contains dissolved salts. The aqueous phase is decanted off after the sponge fines have settled to the bottom, which normally occurs within five minutes and the lights have been screened off. This separates the hard refractory metal material and silicon carbide dust, the dissolved salts, the solubilized and suspended oils, greases and organic chemicals and lights from the refractory metal sponge fines. The mixture is charged with fresh water to cover the sponge fines. The mixer is charged with clean water again and the intense agitation operation is repeated. After the intense mixer is stopped, the aqueous slurry containing the clean slurried sponge fines is drained from the mixing tank and passed through a filter. Heavies, such as bolts, nuts and heavy pieces of sponge remain behind in the tank and are manually removed. The tank can be rinsed with clean water to remove any residual sponge fines. On the filter, the aqueous slurry water is filtered off the sponge fines. Optionally, the sponge finds can be counter-current washed to remove all alkali metal salt.

The clean, wet sponge fines can then be burned, or most preferably, pressed into briquettes which can be used in aluminum alloys.

The sponge fines must be maintained wet to prevent fire. Sponge fines are extremely pyrophoric and moist or dry refractory metal sponge fines are very hazardous to store, transport and/or handle. Thus if the sponge fines are to be stored, they must be stored under water preferably in sealed drums. If they are to be shipped, the sponge fines are preferably shipped under water in sealed drums. Most preferably, the clean, wet sponge fines are removed directly from the intensive mixing and washing steps to the next step for preparing briquettes.

Pressing and Sintering

The clean, fully wetted sponge fines can be compacted at an elevated pressure, such as the pressure of 4000 psi, preferably higher, such as 40,000 psi into shaped bodies. Conveniently, the sponge fines are pressed into briquettes weighing about one pound when dry. The briquettes can be sintered by heating the briquette rapidly and briefly to a temperature between about 950° C. and 1100° C. under vacuum or in an inert atmosphere to cause sintering. As described above, sintering causes some of the individual pieces of the refractory metal to become bonded to each other to form masses having an even higher integrity than sponge fines/salt briquettes described above. The sintering also reduces the surface area of the refractory metal sponge fines. The sintering is done under vacuum or in an inert gas atmosphere, such as under argon or helium. This prevents the refractory metal from combusting and/or forming oxides and nitrides. Sintering at 1000° C. for about four (4) hours is sufficient to form a sintered sponge fines briquette. The resulting briquettes are stable and at room temperature will not support combustion in the absence of a direct flame. Sintered sponge fines briquettes can be stored in the open, they do not require being stored in a sealed container under water. Preferably the sintered briquettes are wrapped as described herein or are stored in sealed containers to prevent contamination from dust and the like.

Pressing

Referring to FIG. 1, in an alternative embodiment of the present invention, the fully wetted clean sponge fines are pressed to form wet sponge fines briquettes. Preferably the sponge fines are pressed at a sufficient pressure to give the briquettes a density approximating the density of the alloy, aluminum alloy or metal melt that the briquette will be utilized in. For example, titanium sponge fine briquettes for use in aluminum melts are compacted to a density of about 2.4, the approximate density of molten aluminum. A compaction pressure of about 36,000 psi will produce compact titanium sponge fine briquettes with a density of about 2.8. When the briquette has a density about equal to the density of the melt, the briquette submerges easily into the surface of the melt and minimizes contact between air and the refractory metal in the briquette the temperature of which on or in the melt approaches the temperature of the melt increasing the oxidation rate of the refractory metal.

The wet, clean sponge fines can be pressed to pressures of less than 20,000 psi, such as pressures of 5000 psi or higher.

The fines can also be pressed at pressures in excess of 20,000 psi. Pressing pressures of about 36,000 psi have been found satisfactory to make briquettes. The pressing must be carried out with wet refractory metal sponge fines. Fully wetted sponge fines are sponge fines that have been drained of water but not otherwise dried. Moist sponge fines constitute a serious safety risk and hazard. As discussed above, water and refractory metal can react to form hydrogen. Hydrogen reacts violently with the oxygen in the air. Water will react with refractory metal and sustain combustion if minor amounts of water are present and ignition occurs. The pressing of moist, not fully wetted, sponge fines at elevated pressures could constitute a serious risk of fire or explosion. Thus the sponge fines utilized in preparing briquettes are drained of water but not otherwise dried before the pressing operation.

Drying

The briquettes are vacuumed dried to remove moisture to 0.05% by weight moisture or less. Preferably the vacuum dryer is indirectly heated. The briquettes can also be fully wetted with water, but dried briquettes are necessary for use as alloying agents preferred. After the drying, the briquettes are packaged to form a wrapped or coated dry briquettes. The briquettes can be packaged individually or in packages of two (2) or more briquettes. Conveniently, the briquettes can be packaged into a roll of 5 briquettes. The briquettes can be packaged with a variety of materials to protect the briquettes from environmental effects. Conveniently, the briquettes can be wrapped in aluminum foil, such as kitchen grade two (2) mil aluminum foil. Preferably the free ends of the foil wrapping are folded over at least twice to form a relatively good seal with the packaging material. The briquettes also can be wrapped with wax paper or plastic films, such as Saran wrap brand plastic film, cellophane brand wrapping film, polyethylene film or polypropylene film, heat shrink plastic file wrap, and the like. Optionally, the briquettes can be dipped or sprayed with a coating material, such as a pigment-free lacquer, varnish, polyurethane, paraffin wax, or other protective coating. Preferably these coatings will be pigment free coatings so as not to contaminate the briquette. Wet briquettes are dipped or sprayed with water compatible coating material. Although a variety of wrapping material and coatings can be used, it appears that when the briquettes are to be used in a refractory metal aluminum alloy or aluminum alloy, the aluminum foil wrapping material appears to be the material of choice for packaging the briquettes.

The wrapping material or coating material for the dried briquettes accomplishes several objectives. The aluminum packaging forms a fire barrier because aluminum and refractory metal for a nonflammable bimetallic alloy. The packaging keeps wetted briquettes wet—partially dry briquettes can be a fire hazard because of the reaction of refractory metal with water in the presence of oxygen to form hydrogen and refractory metal oxide. This reaction is minimized with dry or fully wet briquettes. The packaging also prevents small particles from breaking loose from the briquette. The small particles when separated from the briquettes, are much more reactive and can be more quickly heated than particles in a briquette. Thus, the individual particles are far more dangerous and far more likely to self ignite than the compacted particles in a briquette. The packaging also functions as a spark protector for the briquette against a spark initiating from the briquette or from landing into the mass of particles making up the briquette. A spark will have very little effect on the above wrapping materials and coating materials, but a spark can ignite on a single particle of zirconium or titanium. The packaging is also sparkless, that is, the wrapped or coated briquette will not create a spark if impacted against iron, flint, etc.

After the briquettes are packaged, they are boxed. For purposes of this invention, the term "packaged briquettes" and "packaged formed body of refractory metal" will mean wrapped or coated dried refractory metal briquettes. The briquettes are boxed in amounts of from twenty-five (25) to fifty (50) one pound briquettes per box. However, lighter or heavier briquettes may be made and supplied in larger or smaller boxes, bags, drums, bunches, tubes and the like, at less or greater weights.

Wet briquettes can also be wrapped with metal foil or plastic film and packaged in moisture proof boxes. Wet briquettes are dried, such as in a vacuum dryer, to 0.05% by weight moisture or less before the briquette is added to molten metal or molten metal alloy. Hot refractory metal heated by molten metal vigorously reacts with water as described above.

Acid Leaching

Referring to FIGS. 1 and 3, there may be instances where the surfaces of the clean sponge fines has embedded small iron or iron alloy particles that are not freed during the intense agitation step and thus are not captured by the magnetic separation. Optionally, such sponge fines can be treated with an acid leach to dissolve out the magnetic material and leave the refractory metal sponge fines. Conveniently, the refractory metal sponge fines can be leached with 10% hydrochloric acid. After the leaching operation which normally only takes about a half-hour at a slightly elevated temperature, such as a temperature of 100° F. or higher, the acid leach solution is filtered off the refractory metal sponge fines and the refractory metal sponge fines are washed with water to remove all the acid and the metal acid salts formed by the acid leach. The acid leach sponge fines can be further processed in the same manner as the clean refractory metal sponge fines. That is, the clean sponge fines can be burned, they can be pressed and sintered, can be formed into dried sponge fines/salt briquettes, can be pressed and formed into dry sponge fines packaged briquettes, and/or pressed and formed into wet sponge fines briquettes.

Referring to FIG. 3, when the sponge fines are contaminated with surface contamination, dirt or other materials which cannot be removed by the intensive agitation in clean water, the sponge fines are treated to a detergent wash followed by several water washes. The sponge fines and aqueous detergent are charged into a tank. The resulting mixture is subject to intensive agitation to form a aqueous detergent/sponge fine slurry(I). During the intensive mixing, magnetic rods or bars are inserted into the slurry for a minute or two and then withdrawn. If the bars come out clean without any adherent magnetic material, no further magnetic treatment is carried out. However, if magnetic material is captured by the magnetic bars or rods, magnetic treatment is repeated until all magnetic material have been removed from the slurry. The slurry is agitated for sufficient time to permit the aqueous detergent to clean the surface of the sponge fines and to break off substantially all the hard refractory metal material, i.e., the oxides, nitrides, carbides and bimetallic iron alloys of the refractory metal, from the surface of the refractory metal sponge fines. The intensive agitation is preferably carried out for at least four hours and most preferably for about eight hours to break down and break off the hard particles. Any detergent can be used, but Calgon household dishwashing detergent has been found to work well. The intensive mixer is stopped and the aqueous detergent/sponge fines slurry is permitted to stir to permit all the heavies, if any, and the sponge fines to settle to the bottom of the tank and to let all light material, such as wood and plastic to float to the top of the tank. The aqueous slurry which covers the sponge fines is decanted off. After decantation, the tank is charged with water again. At a minimum sufficient water is added to cover the settled sponge fines. Preferably at least six inches of water head over the settled sponge fines is provided.

In the water washing step, the water/sponge fines are subject to intensive agitation or washing for at least five minutes. The intensive mixer is stopped and the sponge fines are permitted to settle to the bottom of the tank. The sponge fines take about 10 minutes to settle to the bottom of the tank. The wash water is decanted off and the tank is charged with fresh clean water for a second time. The water/sponge fines are subject to intensive mixing for at least five minutes and then the intensive washing is stopped. The aqueous/sponge fine slurry is immediately drained before the sponge fines have settled from the bottom of the tank onto a filter. Any heavies in the charge remain at the bottom of the tank and can be removed manually. The tank can be rinsed out with running clean water to remove residual sponge fines from the tank because of the extreme fire hazard they present. Preferably the tank is left with a charge of water to prevent any potential fire hazard from any residual refractory metal sponge fines.

The aqueous/sponge fine slurry are filtered on the filter and then the sponge fines are subject to displacement washes with clean water. The displacement washes can be countercurrent washes as described above with respect to FIG. 2 or they can be fresh charges of clean water for each displacement wash. Each wash is followed by a filtration. The displacement washes yield clean sponge fines which can be processed as described above with respect to FIG. 1.

The magnetic materials removed during the magnetic treatment described above, can include refractory metal sponge fines having included iron or other magnetic material. These magnetic materials can be subject to acid leach in the same fashion as a clean sponge fines described above to yield acid leach sponge fines which can be returned to the intensive washing to be processed to yield clean sponge fines.

Referring to FIG. 3, the magnetic materials separated from the magnetic rods or bars by the wiping operation contain an appreciable amounts of refractory metal particles. This material can be recycled back into the mixing step to further separate the magnetic material from the particles or alternatively, this separated magnetic material can be treated to an acid leach step similar to the acid leach step described above to remove magnetic materials. The separated magnetic material can be treated with a dilute mineral acid, such as 10% hydrochloric acid at a moderately elevated temperature, such as 100° F., for about a half-hour to leach out the iron and other magnetic material and form iron chloride and other metal chloride salts. The refractory metal is resistant to the acid leach and refractory metal sponge fines free of the magnetic material will remain after the leaching. After the leaching operation, the acid is filtered off the refractory metal sponge fines and the solids are treated to displacement washes with water on the filter to obtain clean refractory sponge fines. These sponge fines can then be returned to the intense agitation step to further complete the cleaning operation.

Traditional sources of refractory metal scrap for the aluminum, magnesium and iron alloying markets have been affected by the introduction of electron beam and plasma beam melting. Previously titanium and zirconium turnings, edge trims, and various other forms produced during the conversions of ingot to finished parts for the aerospace and nuclear markets had high enough impurity inclusion levels to restrict their use as recycle materials. These materials were sold to the alloy markets. Processing these materials in a plasma or electron beam furnace eliminates inclusions and allows them to be recycled to high quality consolidated refractory metal which commands a higher price than the traditional scrap markets. Thus the cost of refractory metal feed materials for the alloy market has risen. The refractory metal sponge fines briquettes can be used as feed material in such the alloy market.

Although the process steps disclosed herein are generally applicable to refractory metal sponge fines processing, the specific examples given below outline the range of application.

In any operation involving the handling or processing of titanium or zirconium sponge fines, safety is a paramount concern. Refractory metal sponge fines are classified as a hazardous material, by virtue of their flammability. Flammability of dry titanium and zirconium sponge fines is an important consideration in the design of any recovery process. Although the flammability characteristics of refractory metal sponge fines has not been specifically studied, some data has been accumulated on titanium powders by the U.S. Bureau of Mines and is summarized in the following paragraphs.

Like many metal powders, titanium is capable of forming explosive mixtures with air. The ignition temperature of titanium dust clouds formed in laboratory equipment with different samples of powder ranged from 330° C. to 590° C. The minimum explosive concentration determine in tests was 0.045 ounces/cubic foot. Measurements of maximum pressure produced in explosions of powder in a closed bomb at a concentration of 0.5 oz./cu ft. ranged from 46 to 81 lb/sq. in. The average rate of pressure rise in the explosion tests was 250 to 3400 lb./sq. in./sec. The minimum energy of electrical condenser discharge sparks required for ignition of a dust cloud was 10 millijoules and for an undispersed dust layer the minimum value was 8 microjoules. Some samples of titanium powder could be ignited by electric sparks in pure carbon dioxide as well as in air. At elevated temperatures in some cases titanium was found to react in nitrogen as well as in carbon dioxide.

U.S. Bureau of Mines. RI3722. RI4835.

Titanium powder in the form of sludge or in a wet condition can be dried safely in a vacuum drier at a temperature not exceeding 110° C. Mixing or blending of dry powder should be done in an inert atmosphere. Tests indicate that the maximum values of oxygen allowed when using different inert gases to prevent an explosion of titanium dust are given in Table I.

TABLE I

| Carbon Dioxide | 0% Oxygen |
| --- | --- |
| Nitrogen | 6% Oxygen |
| Argon | 4% Oxygen |
| Helium | 8% Oxygen |

Because of the highly pyrophoric nature of small titanium particles and zirconium particle in air, titanium sponge fines and zirconium sponge fines have not been utilized as metals. As stated earlier, titanium and zirconium sponge fines are presently reacted with acid to form titanium chloride and zirconium chloride which are then processed along with titanium chloride and zirconium chloride from ores to form titanium and zirconium metal. This is an extremely wasteful process since the metal values of titanium sponge fines and zirconium sponge fines are worth far more than the chloride salts of titanium and zirconium. However, before the advent of the present process, there was no safe way to handle titanium sponge fines and zirconium sponge fines. The safety hazards adherent in such sponge fines prevented their use for anything but the preparation of chloride salts.

EXAMPLE I

Two kilograms of titanium sponge fines, minus 60 mesh, are placed in a food processor half filled with water with a chopping blade turning at 36 rpm to agitate the mixture. One half of a level teaspoon of Calgon dishwashing detergent is added to the mixture. After blending for four hours, the titanium sponge fines are allowed to settle and the detergent water mixture is decanted off. The wet titanium sponge fines are placed on a buchner filter and given a displacement wash with clean water. The water wash is filtered off and the titanium sponge fines on the Buchner funnel are washed with two additional displacement washes of water to yield, after filtration, clean titanium sponge fines.

The wet, washed titanium sponge fines are mixed with 25% by weight potassium titanium fluoride salt (wet basis). The resulting sponge fines salt mixture is compacted into briquettes or discs 2 inches in diameter and one inch thick. The compaction into briquettes results in the expulsion of most of the water from the briquettes. The briquettes are pressed at pressure of about 20,000 psi. Thereafter, the briquettes are wrapped with aluminum foil to prevent the briquettes from being contaminated and to prevent loose fines from falling out of the discs.

The briquettes of titanium sponge fines and potassium titanium fluoride salt have improved flammability resistance. The briquettes can be made to burn when a flame is applied directly to them. However, once the flame is removed, combustion promptly stops. The titanium or zirconium sponge fines are preferably mixed with at least 30% by weight of a potassium refractory metal fluoride salt when mixed with salt. The salt not only makes the briquettes more fire resistant, it helps "flux" the dissolution of the titanium or zirconium into a aluminum alloy melt, such as an aluminum melt.

EXAMPLE II

The wet wash titanium sponge fines from Example I can be pressed directly into discs without salt utilizing the same equipment at the same pressure to yield compressed titanium sponge fines discs. After pressing, the discs are vacuum dried in a steam heater at a temperature of not more than 350° F. to yield dried discs having a moisture content of less than 0.05% by weight. After the discs have cooled to ambient temperature in the vacuum, the discs are wrapped in aluminum foil to prevent contamination of the discs from outside contaminants and to prevent loose titanium fines from falling off the discs. The fines are very hazardous and can potentially combust in the air.

The resulting compressed titanium sponge fines discs will not support combustion in the absence of a direct flame as long as the discs temperature is below the ignition temperature of titanium. When heated with a direct flame in the air, the discs will initiate combustion. However, when the flame is removed, the combustion ceases.

EXAMPLE III

A 1,000 gallon tank is half filled with titanium sponge fines. The tank is charged with 500 gallons of a water detergent mixture (15 pounds Calgon dishwashing detergent). The tank is fitted with a Moorehouse-Cowles direct drive disperser with a 50 hp motor drive to drive. The disperser is operated at about 1200 rpm and allowed to operate for about eight hours. The disperser intensely agitates the water-detergent and titanium sponge fines mixture causing had refractory metal materials and other impurities on the surface of the fines to be dispersed into the liquid phase and thoroughly washing the surface of the titanium sponge fines to remove all oils and other contaminants. The agitation also attirts the hard refractory metal materials and silicon carbide into dust size particles. The whirling mixing blade of the disperser has sufficient agitation to entrain the sponge fines in the aqueous slurry mixture. Larger, heavier materials, like nuts, bolts and the like fall to the bottom of the tank. The agitation of the slurry is not sufficient to slurry these heavier materials into the slurry and they remain on the bottom where they are easily removed by hand following the disperser action.

During the agitation, a magnetic rod is inserted into the tank to collect any magnetic materials, such as iron and bimetallic iron/titanium alloy, in the slurry. A suitable magnetic rod of highly magnetic rear earth oxides supplied by McMaster Carr Supply Company, Aurora, Ohio. Magnetic materials, if present, are attracted and adhere to the rod. After the rod has been within the slurry for a minute, the rod is withdrawn. If there are any magnetic particles adhering to the rod, the rod is wiped off with a cloth or gloved hand to remove the adhering particles and the clean rod is reinserted into the tank. This operation is repeated until the rod remains substantially clean within the slurry which indicates that substantially all the magnetic particles, except for the heavier ones that have dropped to the bottom of the tank, have been removed from the slurry. This simple operation can remove substantially all the magnetic materials, principally iron particles, from the slurry to leave the fines substantially fee of iron. The magnetic separation is done in the beginning and near the end of the agitation.

The disperser is operated for at least two minutes or until the magnetic rod remains clean in the slurry, whichever is longest. The disperser is stopped and the slurry is allowed to settle for a minute or two. The aqueous phase of the slurry is decanted off. The decanted aqueous phase comprises principally water, detergent, suspended or solubilized dirt and oils, very fine fines of titanium, titanium metal oxides, nitrides, carbides, and bimetallic iron/titanium alloy, and silicon carbide. After the decantation, the tank is charged with a fresh charge of clean water (approximately 500 gallons) and the disperser is operated again for at least one minute. The disperser is stopped, the aqueous slurry is allowed to settle for at least two minutes, and the aqueous slurry is decanted off leaving a residual at the bottom of the tank comprising principally of clean titanium metal sponge fines and any heavies if present. The aqueous slurry phase that is decanted off contains principally water, a small amount of detergent, and a very small amount of titanium fines. It may contain a very small amount of fines of hard refractory metal material and silicon carbide.

The tank is charged a third time with clean water and the intensive mixer is started up again and allowed to run for at least one minute. After the disperser is stopped, the aqueous slurry phase is drained out of the bottom of the tank onto a filter. After the tank is drained, the tank is washed with clean water to remove the remaining clean titanium sponge fines. If there were any heavy metal particles in the titanium sponge fines, they remain at the bottom of the tank and can be cleaned out by hand. The drained aqueous slurry phase containing most of the sponge fines is passed to a filter where the aqueous slurry phase is filtered to remove the aqueous phase and washed three times on the filter with equal volumes of water to yield clean titanium sponge fines.

The wet, clean titanium sponge fines are removed from the filter and compressed at about 36,000 psi in a press to produce sponge fines discs or briquettes measuring 1½ inches in thickness and about 3½ inches in diameter. Each briquette weighs approximately one pound when dry. The briquettes are wrapped in aluminum foil and dried under vacuum at 105°–135° C. for two to four hours to a moisture content of about 0.05% by weight. The dried briquettes are cooled to ambient temperature under the vacuum of 10 torrs or less. The wrapped, dried briquettes are stable and are boxed, 20 briquettes per box, and safely stored and transported at ambient temperature.

EXAMPLE IV

The titanium sponge fine briquettes prepared without salt in Example I are placed in a vacuum furnace and heated to 1000° for about four hours. The resulting sintered briquettes are reduced in volume and have a density of at least 80% of theoretical. These briquettes will not sustain combustion in the torch test described above. The briquettes have desirable handling characteristics for charging into titanium melting furnaces.

EXAMPLE V

The tank of Example III is charged with the contents of nine (9) 55 gallon drums containing zirconium sponge fines. The sponge fines contain about 1% iron particles. The tank is charged with 500 gallons of an aqueous detergent mixture and the resulting mixture is mixed in the tank using the intensive mixer. During the mixed step, a highly magnetic rare earth oxide magnet rod measuring ½ inch by 3 feet, supplied by the McMaster Carr Supply Company, is inserted into the tank for about 30 seconds and then withdrawn. The rod is covered with magnetic metallic particles. The rod is wiped clean with a gloved hand and inserted back into the agitated tank. This step is repeated until the rod no longer picks up magnetic metallic particles. The magnetic treatment lowers the iron content of the sponge fines in the slurry to less than 1/10%. The slurry, following the magnetic treatment, is treated in the same manner as the titanium sponge fines of Example III to yield clean sponge fines.

EXAMPLE VI

The clean zirconium sponge fines of Example V in the undried state are compacted to 30,000 psi in a press to produce one pound wet briquettes having a density of about 2.8 grams per cc. The briquettes are fully wetted with clean water and packaged as a roll of 5 briquettes with 4 mil. aluminum foil Ten rolls (50 briquettes total) are boxed together in a moisture barrier box to keep the packaged briquettes wet. Before the briquettes are added to a molten metal melt, the briquettes are dried under vacuum to a moisture content of at least 0.05% or less.

EXAMPLE VII

The clean titanium sponge fines of Example V are added to an acid leach tank containing 10% hydrochloric acid. The slurry is agitated for ½ hour at a temperature of approximately 120° F. The agitation is stopped, the slurry is allowed to settle and the leach liquor is decanted off the leach tank. The residual zirconium sponge fines remaining in the tank are mixed with water, slurried and pumped to a filter as a slurry. The charge of sponge fines on the filter, after filtration of the water, is washed three (3) times on the filter with equal displacements of wash water to yield clean acid leached sponge fines which are virtually free of iron. The acid leach zirconium sponge fines can be utilized to produce wrapped briquettes as described in Example III, or sintered sponge fines briquettes described in Example IV.

EXAMPLE VIII

The separated magnetic metallic particles of Example V wiped off the magnetic rod are inserted into the comminution tank of Example V. These particles contain iron zirconium bimetallic alloy. These particles are treated in the same manner as unprocessed zirconium sponge fines to recover the zirconium sponge fines and separate the magnetic metallic particles. Alternatively, these particles can be treated to the acid leach step of Example V to dissolve out the iron leaving the zirconium sponge fines. The leach step is carried out by using at least a stoichiometric amount of dilute hydrochloric acid, such as 10% hydrochloric acid, at an elevated temperature, such as 110° F., for a sufficient period to cause a dissolution of iron into iron chloride salts. After the leaching step, the remaining zirconium particles can be recycled back into the process of Examples I or III to thoroughly clean the sponge fines as described herein.

EXAMPLE IX

The clean zirconium sponge fines of Example V are compacted at about 36,000 psi in a press to produce 5 pound briquettes measuring 2½ inches thick and 5 inches in diameter. The briquettes are fully wetted with water and packaged in polyethylene film (3 mil). Ten packaged briquettes are boxed in a moisture proof box.

As can be seen from the above description, the process of the present invention offer a number of advantages for the treatment of refractory metal sponge fines which presently have very limited commercial use. The process permits for the easy separation of lighter than water, lights, materials during the initial cleaning step. In addition, the process permits heavier inclusions such as tungsten carbide and nuts and bolts to be easily removed from the sponge fines during the initial cleaning steps when such materials report to the bottom of the mixing tank. A further advantage of the present invention is that the cleaning step removes alkali metal halide salts which frequently accompany sponge fines because such salts are used as a fire extinguisher during normal processing and in order to produce the sponge fines. These salts are dissolved by the aqueous cleaning solution or by subsequent water washes. The process also removes oils and grease and organic chemical contaminants from the surface of the sponge fines to yield clean sponge fines which can be utilized in aluminum alloys. Additionally, the present processes provides for the separation by decantation of lights and floating materials such as dirt, relatively impure dust fines of silicon carbide and hard refractory metal materials. Moreover, the present process because of the vigorous agitation permits the removal of the refractory metal carbides, oxides, nitrides and refractory metal/iron bimetallic alloy from the surface of the refractory metal sponge fines thus further purifying them and making them a superior product for mater alloying. It is far cheaper to form the briquettes of the present invention following the cleaning steps than to take the refractory metal sponge fines and form them into an existing material such as aluminum zirconium (waffle) base products. These products involve additional process steps which are expensive to make.

I claim:

1. A process for converting refractory metal sponge fines into pure, clean refractory metal sponge fines substantially free of hard refractory metal materials, silicon carbide, heavy pieces of iron alloy and tungsten carbide, alkali metal halide salts, dirt, and oils, grease, organic chemical contaminants comprising the steps of:

vigorously agitating the refractory metal sponge fines with an aqueous solution for a sufficient period to break off the hard refractory metal materials from the surface of the refractory metal sponge fines, powder the silicon carbide and hard refractory metal materials in the refractory metal sponge fines, dissolve the alkali metal halide salts contaminating the refractory metal sponge fines and cleaning off dirt, dust, grease, oil and organic chemical contaminants on the surface of and in the refractory metal sponge fine;

separating the vigorously agitated refractory metal sponge fines from the aqueous solution; and washing the separated refractory metal sponge fines with water to wash off adherent aqueous solution to yield pure, clean refractory metal sponge fines.

2. The process according to claim 1 wherein the washing of the refractory metal sponge fines comprises at least one displacement washing with water.

3. The process according to claim 2 wherein the refractory metal sponge fines after the displacement washing step are subject to a counter-current washing comprising at least three (3) stages wherein the refractory metal sponge fines pass progressively from the first stage to the second stage to the third stage and the water wash fluid progresses, progressively, from the third stage to the second stage to the first stage so that the refractory metal sponge fines as they progressively pass through the stages are washed with cleaner wash water fluid at each stage.

4. The process according to claim 1 wherein the clean refractory metal sponge fines are at least partially dried and burned in the open air.

5. The process according to claim 3 wherein the clean refractory metal sponge fines are compressed at an elevated pressure of at least 5000 psi to form a shaped formed body; and the formed body is sintered at an elevated temperature between about 950° C. and 1100° C. for a sufficient period of time to sinter the refractory metal sponge fines in the formed body to yield sintered refractory sponge fines formed bodies.

6. The process according to claim 3 including the steps of mixing the clean refractory metal sponge fines thoroughly with an alkali metal halide salt and/or alkali metal type to produce a refractory metal sponge fines/salt mixture;

pressing the sponge fines refractory metal/salt mixture at an elevated pressure of at least 5000 psi into a predetermined shape to form sponge fines refractory metal/salt formed bodies; and drying the pressed formed bodies at an elevated temperature under conditions to prevent the ignition and combustion of the formed bodies to produce dried sponge fines refractory metal/salt formed bodies.

7. The process according to claim 6 wherein the alkali metal halide salt type is potassium refractory metal halide, the refractory metal of the salt and of the sponge fines being the same.

8. The process according to claim 6 wherein the alkali metal halide salt type includes an alkali metal refractory metal halide and an alkali metal boron fluoride salt.

9. The process according to claim 6 wherein the alkali metal halide salt type is a mixture of an alkali metal refractory metal halide and an alkali metal halide.

10. The process according to claim 6 wherein the dried refractory metal sponge fines/salt formed bodies on a dry basis comprise by weight about 10% to about 65% alkali metal halide salt type with the balance being refractory metal sponge fines.

11. The process according to claim 3 wherein the clean refractory metal sponge fines are compressed at an elevated pressure to form a shaped formed body; the formed body is dried at an elevated temperature in a vacuum to form a dried formed body; and the dried formed body is packaged to form a dried packaged formed body of refractory metal sponge fines.

12. The process according to claim 11 wherein the dried formed body is packaged by wrapping it with aluminum foil.

13. A process for converting refractory metal sponge fines into pure, clean refractory metal sponge fines substantially free of hard refractory metal materials, silicon carbide, heavy pieces of iron alloy and tungsten carbide, alkali metal halide salts, dirt, and oils, grease, organic chemical contaminants comprising the steps of:

vigorously agitating the refractory metal sponge fines with an aqueous detergent solution for a sufficient period to break off the hard refractory metal materials from the surface of the refractory metal sponge fines, powder the silicon carbide and hard refractory metal materials in the refractory metal sponge fines, dissolve the alkali metal halide salts contaminating the refractory metal sponge fines and cleaning off dirt, dust, grease, oil and organic chemical contaminants on the surface of and in the refractory metal sponge fine;

separating the vigorously agitated refractory metal sponge fines from the aqueous detergent solution; and washing the separated refractory metal sponge fines with water to wash off adherent aqueous solution to yield pure, clean refractory metal sponge fines.

14. The process according to claim 13 wherein the clean refractory metal sponge fines are slurried with fresh, clean wash water to further clean the refractory metal sponge fines and separating the refractory metal sponge fines from the wash water.

15. The process according to claim 13 wherein the clean refractory metal sponge fines are slurried with wash water and passed to a filter, the slurring action being sufficient to slurry the clean refractory metal sponge fines but being insufficient to slurry any heavy metal objects; and separating the refractory metal sponge fines/water slurry from the heavy metal objects.

16. The process according to claim 15 wherein the wash water is filtered off the clean refractory metal sponge fines on the filter.

17. The process according to claim 16 wherein the clean refractory metal sponge fines are washed with at least one (1) displacement washing with water on the filter.

18. The process according to claim 13 wherein the clean refractory metal sponge fines are separated from the wash water and subject to an acid leach with aqueous mineral acids to remove acid leachable materials from the clean refractory metal sponge fines to yield clean refractory metal sponge fines substantially free as acid leachable materials; and washing the resulting clean refractory metal sponge fines with water to remove aqueous mineral acids and acid salts from the clean refractory metal sponge fines.

19. The process according to claim 13 wherein magnetic bodies are introduced into the slurry during mixing to remove magnetic particles from the slurry.

20. A refractory metal sponge fines packaged formed body suitable for alloying in aluminum and iron alloy melts comprising a compressed formed body of refractory metal sponge fines substantially free of hard refractory metal materials, silicon dioxide, large pieces of tungsten carbide and iron alloy, alkali metal halide salts, and dirt, dust, oils, greases and organic chemical contaminants on the surface of or in the refractory metal sponge fines having a moisture content of less than 0.01%; the refractory metal sponge fines packaged formed body being packaged to prevent refractory metal sponge fines particles from dropping off the formed body.

* * * * *

UNITED STATES PATENT AND TRADEMARK OFFICE
CERTIFICATE OF CORRECTION

PATENT NO : 5,776,225
DATED : July 7, 1998
INVENTOR(S) : JOSEPH A. MEGY

It is certified that error appears in the above-identified patent and that said Letters Patent is hereby corrected as shown below:

On the cover page of the patent, the notice reading:

"Notice: The term of this patent shall not exceed beyond the expiration date of Pat. No. 5,471,359."

should read:

"Notice: The term of this patent shall not exceed beyond the expiration date of Pat. No. 5,171,359 and Pat. No. 5,597,401."

Signed and Sealed this

Third Day of November, 1998

*Attest:*

BRUCE LEHMAN

*Attesting Officer*   *Commissioner of Patents and Trademarks*